(12) United States Patent
Kaminiski et al.

(10) Patent No.: US 6,972,507 B1
(45) Date of Patent: Dec. 6, 2005

(54) END WINDING RESTRAINT IN AN ELECTRICAL MACHINE

(75) Inventors: Christopher Anthony Kaminiski, Schenectady, NY (US); Robert John Nygard, Saratoga Springs, NY (US); Anand Shankar Tanavde, Albany, NY (US); James Pellegrino Alexander, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/849,803

(22) Filed: May 21, 2004

(51) Int. Cl.⁷ .............................................. H02K 3/46
(52) U.S. Cl. ...................................................... 310/270
(58) Field of Search ............................... 310/270, 260, 310/261

(56) References Cited

U.S. PATENT DOCUMENTS

| | | | |
|---|---|---|---|
| 4,363,982 A | | 12/1982 | Kaminski |
| 4,543,503 A | | 9/1985 | Kaminski et al. |
| 4,667,125 A | | 5/1987 | Kaminski et al. |
| 4,709,177 A | | 11/1987 | Kaminski |
| 4,814,655 A | | 3/1989 | Kaminski |
| 5,065,064 A | | 11/1991 | Kaminski |
| 5,281,877 A | | 1/1994 | Kazmierczak et al. |
| 5,358,432 A | | 10/1994 | Shih et al. |
| 5,666,016 A | * | 9/1997 | Cooper ........................ 310/270 |
| 5,886,434 A | | 3/1999 | Nygard |
| 5,929,550 A | | 7/1999 | Kaminski et al. |
| 5,986,380 A | | 11/1999 | Kaminski et al. |
| 6,081,178 A | | 6/2000 | Wang et al. |
| 6,181,228 B1 | | 1/2001 | Laskaris et al. |
| 6,194,807 B1 | | 2/2001 | Kaminski et al. |
| 6,198,371 B1 | | 3/2001 | Laskaris et al. |
| 6,201,462 B1 | | 3/2001 | Laskaris et al. |
| 6,239,527 B1 | | 5/2001 | Kaminski et al. |
| 6,246,308 B1 | | 6/2001 | Laskaris et al. |
| 6,291,919 B1 | | 9/2001 | Ganti et al. |
| 6,313,561 B1 | | 11/2001 | Nygard et al. |
| 6,339,268 B1 | | 1/2002 | Kaminski et al. |
| 6,346,753 B1 | | 2/2002 | Jarczynski et al. |
| 6,346,754 B1 | * | 2/2002 | Kieda et al. ................... 310/58 |
| 6,369,482 B1 | | 4/2002 | Rink, Jr. et al. |
| 6,415,613 B1 | | 7/2002 | Ackermann et al. |
| 6,437,476 B1 | | 8/2002 | Nygard et al. |
| 6,438,969 B1 | | 8/2002 | Laskaris et al. |
| 6,442,949 B1 | | 9/2002 | Laskaris et al. |
| 6,448,686 B1 | | 9/2002 | Dawson et al. |
| 6,495,942 B1 | | 12/2002 | Kaminski et al. |
| 6,593,676 B2 | * | 7/2003 | Zeller et al. ................. 310/270 |

* cited by examiner

Primary Examiner—Darren Schuberg
Assistant Examiner—Nguyen Hanh
(74) Attorney, Agent, or Firm—Nixon & Vanderhye P.C.

(57) ABSTRACT

The rotor body of an electrical machine has end windings supported by a plurality of circumferentially spaced rakes having tines between which the end windings pass in an arcuate pattern from and for return to an axial orientation within the rotor body. The rakes are supported on axial beams secured to the rotor body. An end disk is secured at the opposite ends of the beams and to a shield overlying the end windings. The rakes, beams and end disks provide axial end winding restraint. The end disk is weighted at selected circumferential locations to resist tendencies of the end windings to distort, e.g., toward an elliptical or non-concentric configuration about the rotor axis.

9 Claims, 6 Drawing Sheets

END WINDING RESTRAINT IN AN ELECTRICAL MACHINE

BACKGROUND OF THE INVENTION

The present invention relates generally to electrical machines of the type having a rotor and field windings, including end windings about the rotor body and particularly relates to restraints for restraining axial movement of the end windings and minimizing distortion of the rotor end windings in circumferential and axial directions.

In electrical machines, for example, generators, there is provided a rotor body having field windings which in part extend from the rotor body to form arcs at the opposite ends of the rotor body called end windings. The end windings extend generally axially from the rotor body and cross over supports or spindles in a circumferential direction adjacent opposite ends of the body for return in an axial direction into and along the rotor body. In a typical generator construction, the windings are located in slots in the rotor body and wedges secure the windings in the slots. The end windings are typically separated from one another by spacer blocks. More recent generators include a rotor body having defined pole regions with pole faces and parallel sides, together with prefabricated winding modules extending along the parallel sides with the prefabricated end windings extending beyond end faces of the rotor body. In both types of generator constructions, the end windings can become distorted, i.e., elliptically deformed and lose concentricity if not supported. Also, the end windings have a tendency to displace axially when the generator is operated at speed. Consequently, there is a need for end winding restraints in electrical machines having structures which minimize distortion and resist and restrain both circumferential and axial movement of the end windings.

BRIEF DESCRIPTION OF THE INVENTION

In accordance with a preferred embodiment of the present invention, the rotor body has field windings and end windings which are restrained against both axial and circumferential movement. Particularly, the rotor body includes beams secured to an end face of the rotor body and which beams extend axially for securement to an annular end disk. Between the rotor end face and the annular end disk are a plurality of circumferentially spaced rakes mounted on the beams. The rakes include a plurality of axially spaced tines for receiving the end windings. The rakes and end disk restrain the end windings against axial movement. The end disk is also weighted such that the tendency of the end windings to become distorted, i.e., elliptically deformed and lose concentricity at speed, is effectively resisted. The end disk is weighted symmetrically in a diametrical direction to preclude imbalance of the rotor. The end disk also includes generally radially extending passages along the inner face which weight the portions of the disk not having passages. The passages also provide for transmission of cooling fluid generally radially outwardly and through apertures in the enclosure about the rotor body.

In accordance with a preferred embodiment according to the present invention, there is provided a restraint arrangement for end windings of a rotor in an electrical machine comprising an end winding support having a plurality of axially extending, circumferentially spaced support beams secured at one end to the rotor body against movement in an axial direction and a plurality of circumferentially spaced, axially extending support rakes radially outwardly of respective beams for receiving the circumferentially extending end windings between axially spaced tines of the rakes and restraining the end windings against axial movement.

In a further preferred embodiment according to the present invention, there is provided an arrangement for restraining deformation of end windings of a rotor about a rotor axis in an electrical machine comprising a rotor body, field windings extending along the rotor body including the end windings and a support assembly for the end windings including a disk extending generally normal to the axis of rotation of the rotor body, the rotor body having a quadrature axis and the disk having a weight distribution thereabout such that the disk has a greater diametrically symmetrical weight along the quadrature axis than the diametrically symmetrical weight along a direct axis perpendicular to the quadrature axis and the axis of rotation.

DETAILED DESCRIPTION OF THE INVENTION

Figure 1:
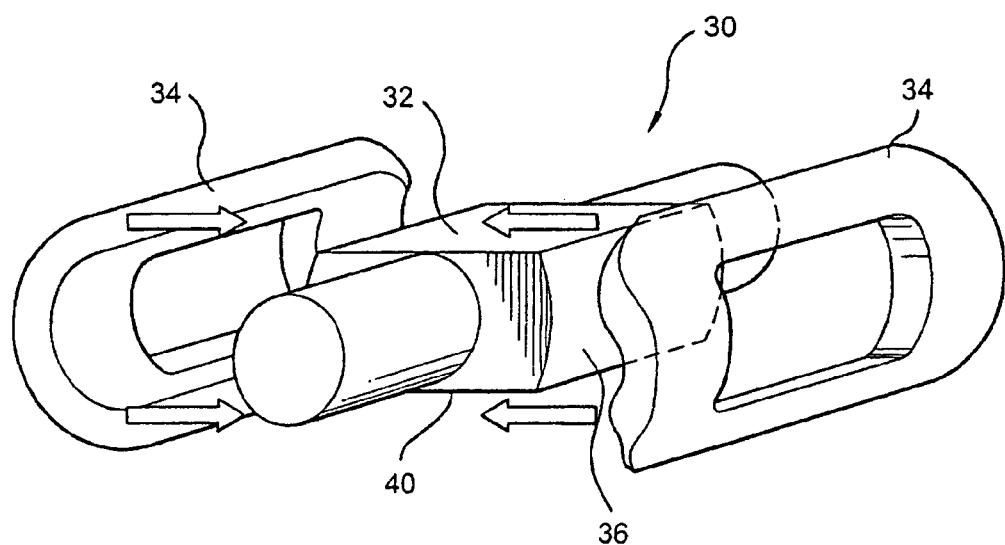
FIG. 1 is a perspective view of a prior art rotor in an electrical machine.
Figure 2:
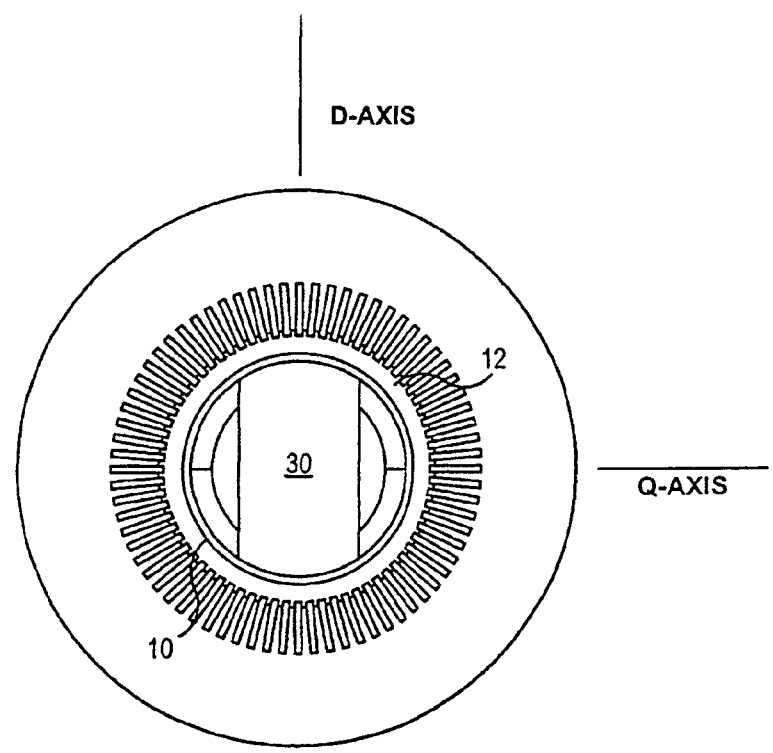
FIG. 2 is a schematic illustration of the rotor of FIG. 1 and a stator as viewed from an end of the electrical machine.

As illustrated in drawing FIGS. 1 and 2, a generator rotor 30 includes a multi-pole magnetic core 32 (a two-pole core being shown) and a plurality of prefabricated winding assemblies 34, one for each pole, and corresponding pole faces 36. The construction and materials of the magnetic core 32 and winding assemblies 34 are known. The prefabricated winding assemblies are disposed over the parallel side forging forming the rotor body 40, and are curved in an arc generally concentric with the rotor body. As illustrated in FIG. 2, the rotor is disposed within a stator and an air gap 12 exists between an enclosure 10 about the rotor and the inner surface of the stator. For orientation purposes, there is illustrated in FIG. 2 a quadrature axis Q extending normal to both the axis of rotation of the rotor and the flat side surfaces. The direct axis D extends normal to the Q axis and the axis of rotation. While the present specification discloses an advanced carbon fiber rotor enclosure (CFRE) electrical machine, the present invention is applicable to conventional electrical machines having rotors with field windings disposed in axially extending, circumferentially spaced slots in the rotor body. In the latter conventional machines, wedges are used to maintain the windings in the slots and those field windings include end windings projecting beyond end faces of the rotor body which require support and restraint similarly as in the CFRE electrical machine.

Figure 3:
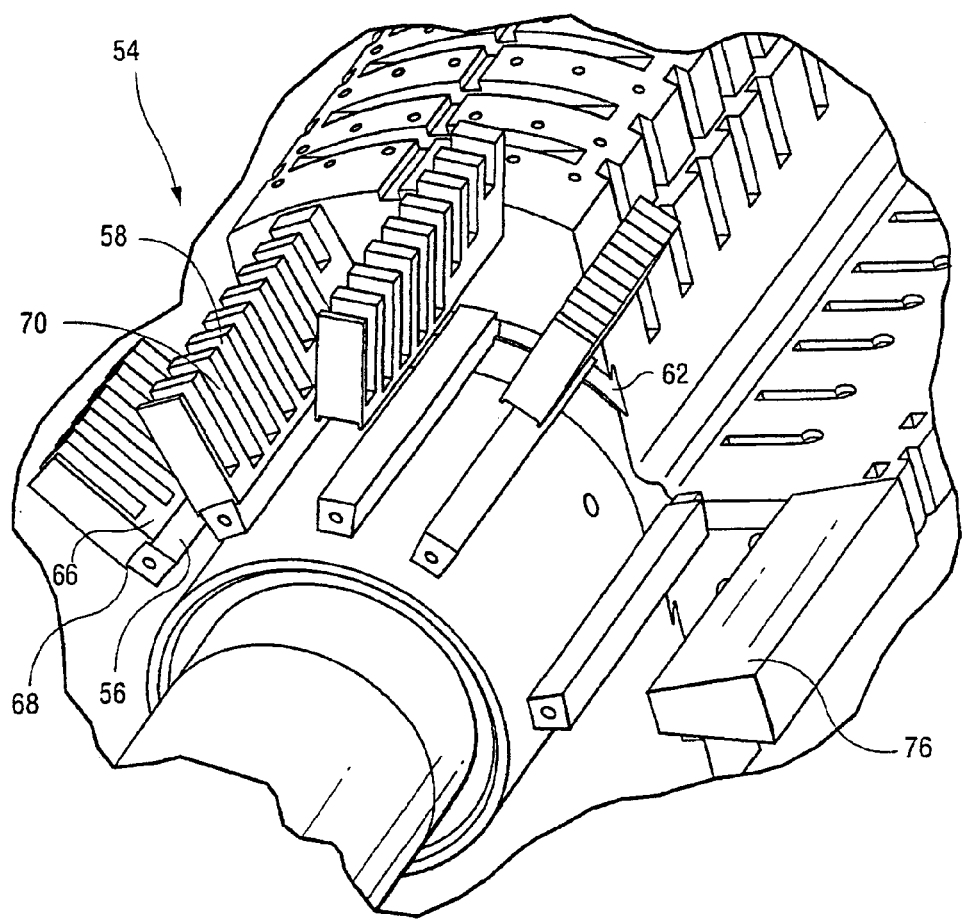
FIG. 3 is a fragmentary perspective view of the rotor body of FIG. 1 illustrating end winding supports and restraints in accordance with an aspect of the present invention.
Figure 4:
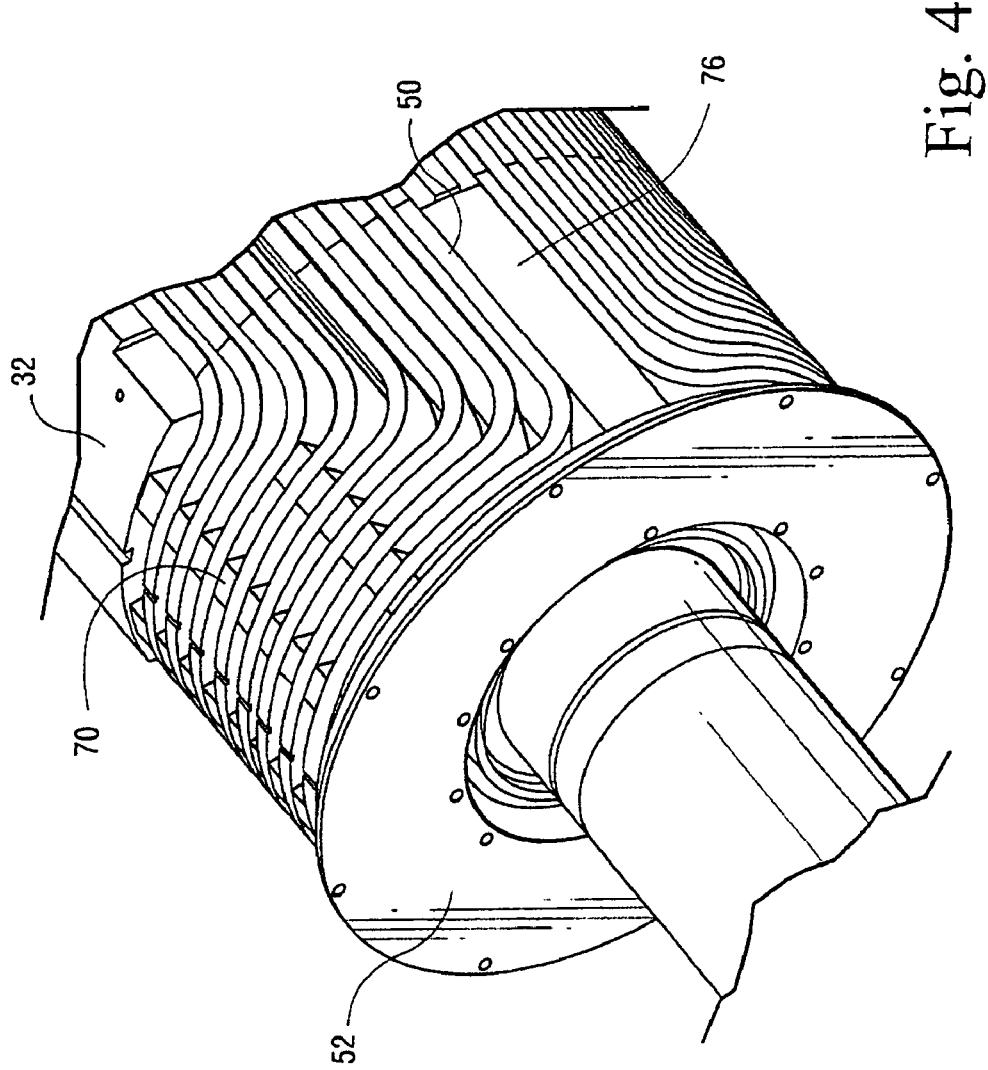
FIG. 4 is a view similar to FIG. 3 with the enclosure removed and the restraints and supports for the windings shown in perspective.
Figure 5:
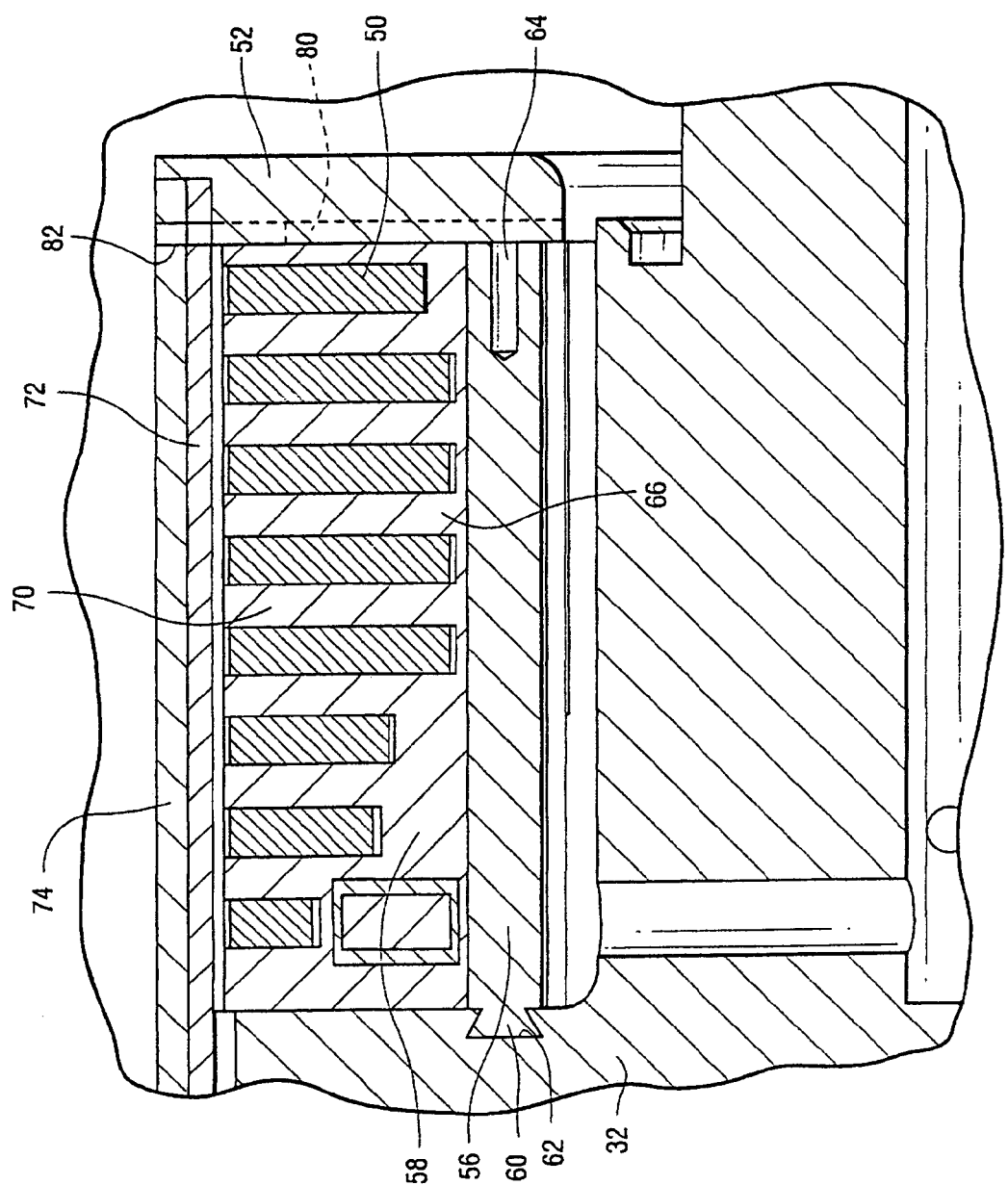
FIG. 5 is an enlarged cross-sectional view of the end windings illustrated in FIG. 3.

As illustrated in FIGS. 4 and 5, end windings 50 extend generally axially from the rotor body 40 and form an arc overlying reduced ends of the rotor body for return in an axial direction through the rotor body. An end disk 52 is secured to the rotor and to a shield 72 underlying an enclosure 74 (FIG. 5) about the end windings as described below. In FIG. 3, an end winding support assembly 54 is illustrated. The assembly 54 includes a plurality of axially extending, circumferentially spaced beams 56 and a corresponding number of axially extending, circumferentially spaced support rakes 58 (FIGS. 3 and 5) for spacing the end windings in an axial direction one from the other. The beams 56 are secured to the end face of the rotor body, for example, by a dovetail connection, with each beam having a projecting dovetail 60 (FIG. 5) for disposition in a corresponding arcuate dovetail slot 62 (FIGS. 3 and 5) in the end face of the rotor. The beams 56 are circumferentially spaced one from the other and are secured at their opposite ends by bolts 64 (FIG. 5) passing through a radially inner portion of the annular disk 52.

Figure 7:
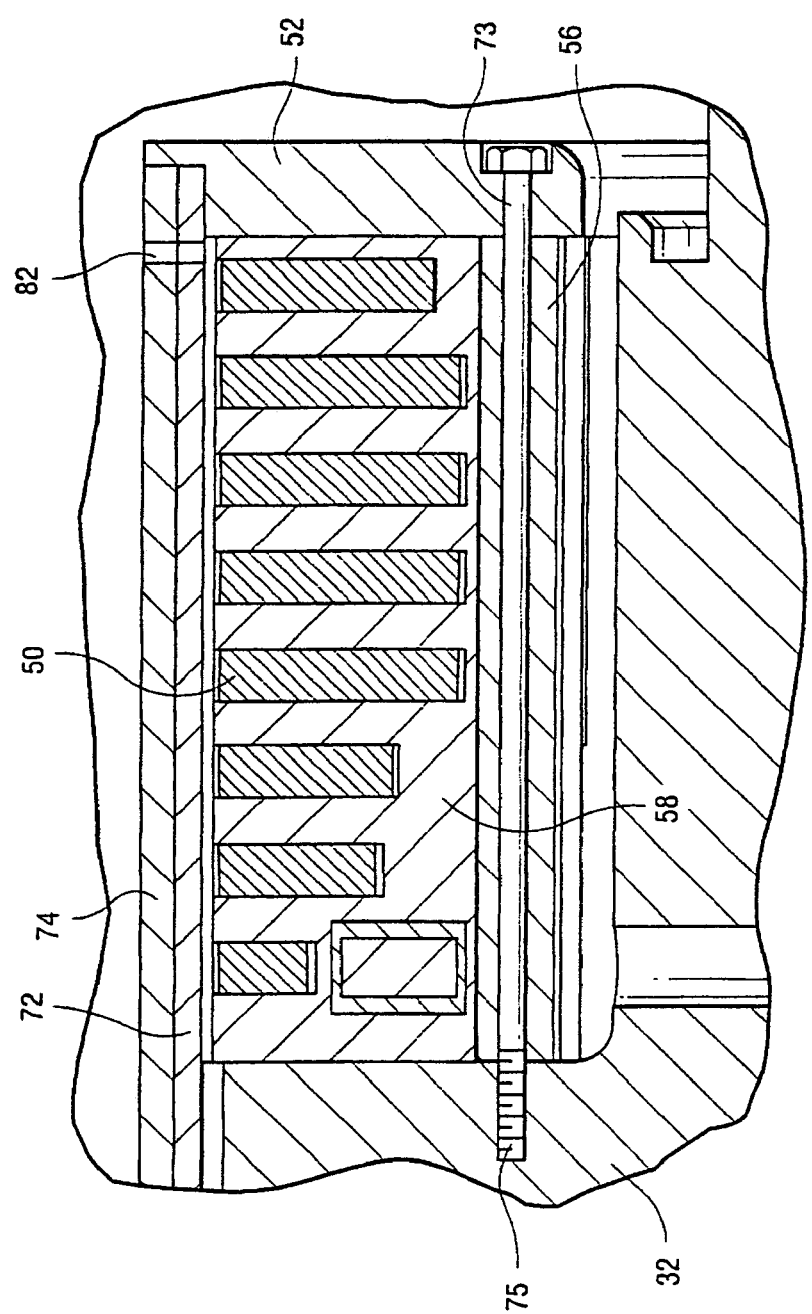
FIG. 7 is a view similar to FIG. 5 illustrating another embodiment of the end winding restraints and supports.

Each of the axial support rakes 58 includes a base 66 having a pair of depending flanges 68 (FIG. 3) defining a groove for receiving the beams 56 with the flanges 68 straddling the beams. Consequently, the rakes 58 extend axially between the end face of the rotor body and the inside face of the disk 52. The rakes 58 include a plurality of spacers or tines 70 for receiving the arcuate portions of the end windings 50 as those end windings extend arcuately over the end of the rotor body. As illustrated in FIG. 5, the end windings and rakes are axially confined by a cylindrical end shield 72, in turn radially underlying a cylindrical enclosure 74. As illustrated in FIG. 5, the radial outer end of the disk 52 is bolted to the end face of the shield 72. In an alternative form of the present invention illustrated in FIG. 7, the beams 56 may have axially extending through holes whereby bolts 73, extending through the disk 52 and the length of the beams 56, may be threaded into female threaded openings 75 in the end face of the rotor in lieu of the dovetail connection. In FIG. 3, there is also illustrated a beam which supports an interpolar brace 76. The brace spaces the outermost coil from one pole against circumferential displacement of the outermost coil of an adjacent coil.

Figure 6:
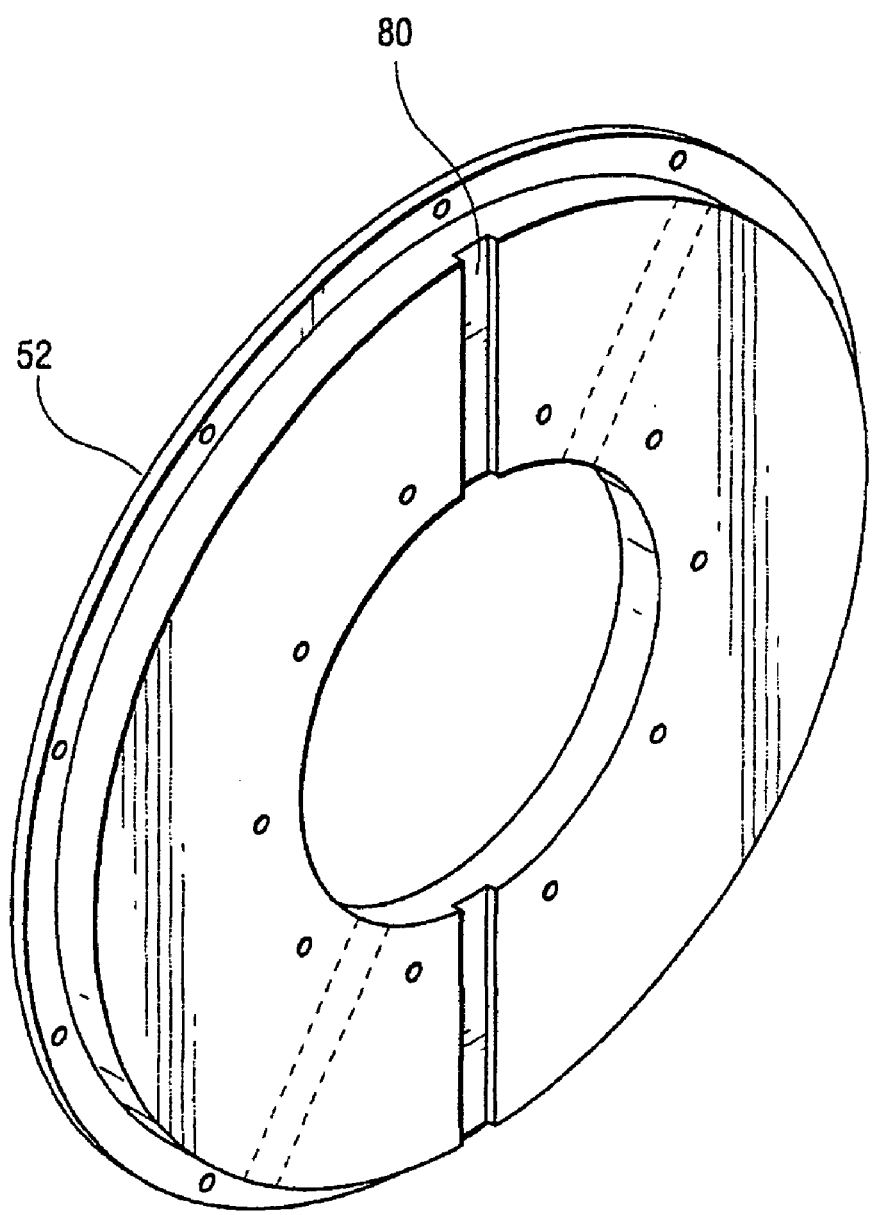
FIG. 6 is an axial view of the inside face of the annular end disk.

To prevent or minimize distortion of the end windings, and loss of concentricity, as referred to FIG. 6, the disk 52 is weighted. The weighting of the disk distributes the mass of the disk to alleviate uneven distribution of the load that serves as the primary cause of distortion, e.g., elliptical or non-concentric deformation, upon rotation of the rotor. Thus, grooves 80 are formed along the inside face of the disk 52. The grooves are diametrically symmetrical such that the weighted portions of the disk, i.e., portions other than the grooves, are diametrically balanced. Thus, the weight of the disk at locations 90° from the locations of the radial grooves is greater than the weight of the disk at the locations of the grooves. The circumferential locations of the heavier portions of the disk preferably lie along the quadrature axis Q to effectively counter the deformation of the end windings toward an elliptical or non-concentric shape. Moreover, the radial passages formed to dynamically balance the rotor at symmetrical diametrical positions also serve as passages for flowing a cooling medium generally radially outwardly of the rotor body. Consequently, apertures 82 are formed through the overlying shield 72 and enclosure 74 and lie in communication with the radial passages 80 which, in turn, lie in communication with a cooling flow manifold, not shown, within the rotor. The centrifugal pumping action of the rotating rotor body causes the cooling medium to flow outwardly along the passages 80, cooling the largest of the end windings for exit into the air gap between the rotor body and the stator. Consequently, the radial passages serve the dual purpose of affording transmission of the cooling medium, as well as providing the weight distribution on the end disk which avoids tendencies of the end windings toward an elliptical or non-concentric shape.

It will also be appreciated that the support assembly including the beams and weights, as well as the end disk, provide axial support for the end windings against thermal expansion of the rotor windings. The tines 70 of the rakes 58 also provide a means for supporting the windings 50 during winding assembly and maintain the individual windings separated from one another at a fixed spacing.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A restraint arrangement for end windings of a rotor in an electrical machine comprising:
   an end winding support having a plurality of axially extending, circumferentially spaced support beams secured at one end to the rotor against movement in an axial direction; and
   a plurality of circumferentially spaced, axially extending support rakes radially outwardly of respective beams for receiving the circumferentially extending end windings between axially spaced tines of the rakes and restraining the end windings against axial movement.

2. A restraint according to claim 1 wherein said beams are secured at said one end to an end face of the rotor by a tongue-and-groove connection.

3. A restraint according to claim 1 including an annular end disk secured to said beams for precluding axial thermal expansion of the rotor end windings.

4. A restraint according to claim 1 including an interpolar brace outwardly of a rotor end spindle disposed to space an outermost end winding from one pole of the rotor against circumferential displacement of an outermost end winding of each adjacent pole.

5. A restraint according to claim 1 including an annular end disk secured to said beams for precluding axial expansion of the rotor end windings, said disk having a predetermined and variable weight distribution about the disk for minimizing tendencies of the end windings to lose concentricity upon rotation of the rotor about an axis thereof.

6. A restraint according to claim 5 wherein said weight distribution is diametrically symmetrical to avoid imbalancing the rotor.

7. A restraint according to claim 5 wherein said weight distribution is in part provided by diametrically opposed recesses formed in a face of the disk.

8. A restraint according to claim 7 including an enclosure about the end windings and having apertures therethrough adjacent said disk, said recesses lying in communication with said apertures respectively affording passages for flowing the cooling medium outwardly of the rotor.

9. A restraint according to claim 1 in combination with a rotor body having defined pole regions and pole faces and parallel sides adjacent the pole faces, prefabricated field winding modules having sequentially abutting flat field windings, said modules being disposed over the parallel sides of the rotor body, said rotor having a quadrature axis generally perpendicular to said parallel sides, said weight distribution about said disk being such that the disk has a greater diametrically symmetrical weight along the quadrature axis than the diametrical symmetrical weight along a direct axis perpendicular to the quadrature axis and the axis of rotation.

* * * * *